United States Patent
Accapadi et al.

(10) Patent No.: US 7,475,194 B2
(45) Date of Patent: *Jan. 6, 2009

(54) APPARATUS FOR AGING DATA IN A CACHE

(75) Inventors: Jos Accapadi, Austin, TX (US); Andrew Dunshea, Austin, TX (US); Greg R. Mewhinney, Austin, TX (US); Mysore Sathyanaranyana Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/968,481

(22) Filed: Jan. 2, 2008

(65) Prior Publication Data

US 2008/0133837 A1 Jun. 5, 2008

Related U.S. Application Data

(63) Continuation of application No. 11/201,642, filed on Aug. 11, 2005, now Pat. No. 7,337,276.

(51) Int. Cl.
*G06F 12/00* (2006.01)
(52) U.S. Cl. .................. 711/133; 711/122; 711/129; 711/144
(58) Field of Classification Search .............. None
See application file for complete search history.

(56) References Cited

U.S. PATENT DOCUMENTS 6,594,742 B1 * 7/2003 Ezra .................. 711/159
2003/0221069 A1 11/2003 Azevedo et al.
2005/0132142 A1 * 6/2005 Batcher ................ 711/135

OTHER PUBLICATIONS

Brenza et al., "Multi-level Cache System for MP", IBM Technical Disclosure Bulletin, No. 3, Aug. 1991, pp. 256-258.
Haig et al., "Modified Cache Line Advance-Replacement Indicator", IBM Technical Disclosure Bulletin, vol. 38, No. 8, Aug. 1995, pp. 219-224.

* cited by examiner

*Primary Examiner*—Reginald G Bragdon
*Assistant Examiner*—Shawn X Gu
(74) *Attorney, Agent, or Firm*—Duke W. Yee; Matthew W. Baca; Houda T. El-Jarrah

(57) ABSTRACT

A computer implemented method, apparatus, and computer usable code for managing cache data. A partition identifier is associated with a cache entry in a cache, wherein the partition identifier identifies a last partition accessing the cache entry. The partition identifier associated with the cache entry is compared with a previous partition identifier located in a processor register in response to the cache entry being moved into a lower level cache relative to the cache. The cache entry is marked if the partition identifier associated with the cache entry matches the previous partition identifier located in the processor register to form a marked cache entry, wherein the marked cache entry is aged at a slower rate relative to an unmarked cache entry.

12 Claims, 3 Drawing Sheets

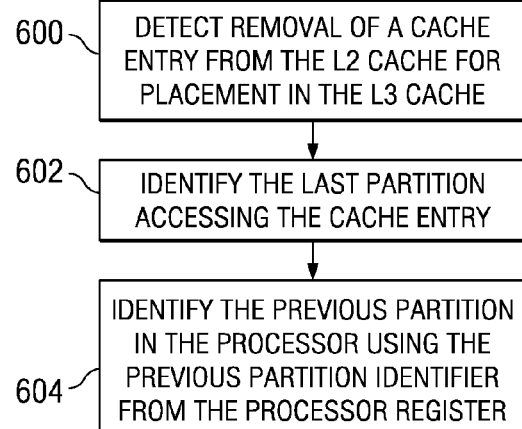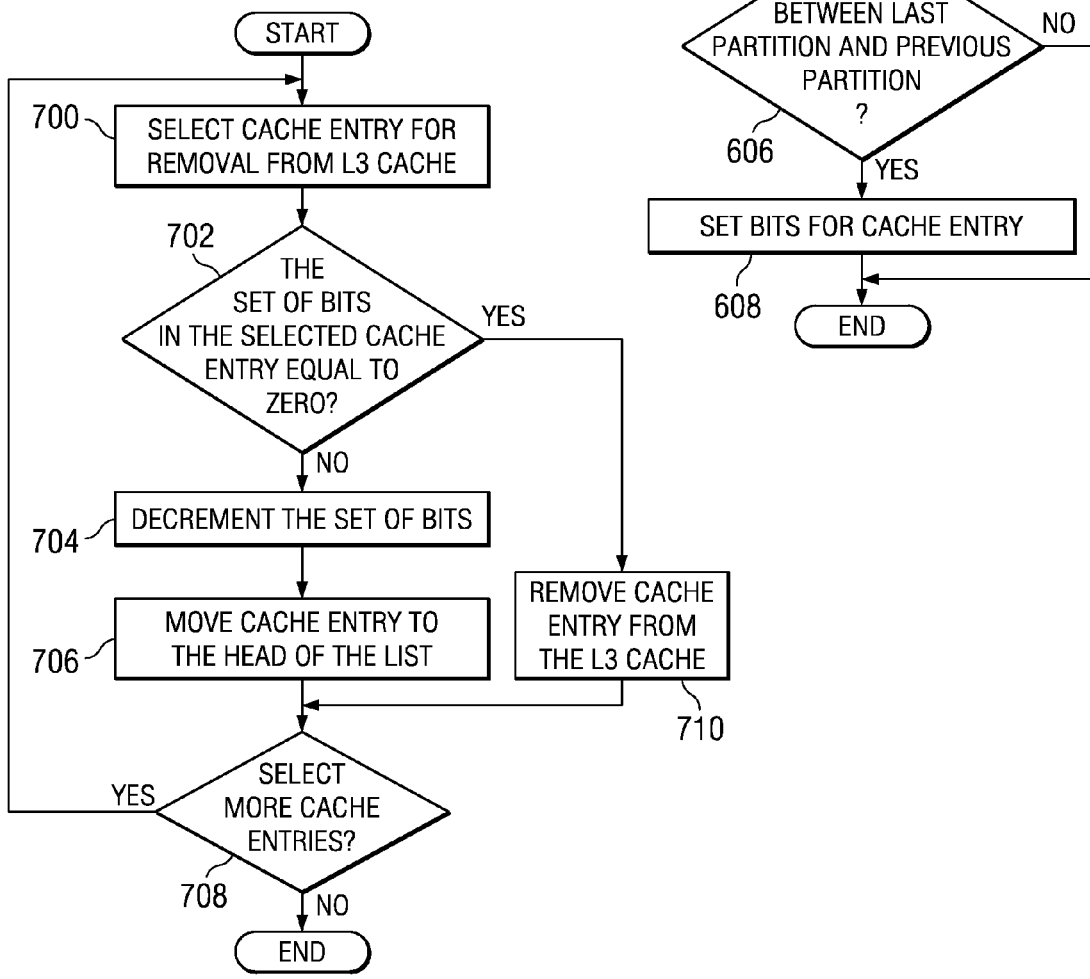

APPARATUS FOR AGING DATA IN A CACHE

This application is a continuation of application Ser. No. 11/201,642, filed Aug. 11, 2005, now U.S. Pat. No. 7,337,276.

BACKGROUND OF THE INVENTION

1. Field of the Invention

The present invention relates generally to an improved data processing system and in particular to a computer implemented method and apparatus for managing data. Still more particularly, the present invention relates to a computer implemented method and apparatus for managing data in a multi-level cache system.

2. Description of the Related Art

A cache is a component in a data processing system used to speed up data transfer. A cache may be temporary or permanent. With respect to caches used by processors, these types of caches are typically used to allow instructions to be executed and data to be read and written at a higher speed as opposed to using main memory. Instructions and data are transferred from main memory to cache in blocks. This transfer is typically performed using a look-ahead algorithm. When instructions in the routine are sequential or the data being read or written is sequential, a greater chance is present that the next required item will already be present in the cache. This situation results in better performance in the data processing system.

Examples of caches include memory caches, hardware and software disk caches, and page caches. With respect to caches used by microprocessors for executing code, many systems are built in which a level one cache is provided in which the level one cache is accessed at the speed of the processor. This level one cache also is referred to as a L1 cache. Additionally, most systems also include a level two cache, also referred to as a L2 cache. This L2 cache is often integrated with the processor. For example, a processor that is placed on a motherboard often really contains two chips. One chip contains the processor circuit with an L1 cache. The other chip contains an L2 cache. These types of systems also include a level three or L3 cache. This L3 cache is often designed as a special memory bank that is located on the motherboard, providing faster access than main memory, but slower access than an L2 or L3 cache on the processor itself.

Entries in the L2 cache are the most current and most entries in the L2 cache need to be reloaded when switching virtual partitions in a data processing system. Vitalization through shared processor logical partitions (SPLPAR) is a technology that allows multiple operating system instances to share a single processor. Prior to SPLPAR, an individual processor was the domain of a single operating system. To run multiple operating system instances on a single processor, periodically the running partition is stopped, its state saved, and another partition started on the same processor.

It is highly desirable when an L2 cache footprint for the virtual partition can be retrieved from the L3 cache. If the entries are not present in the L3 cache, the addresses are then fetched from another cache or memory. This situation results in more time being needed to retrieve this information.

When a virtual partition is switched in a processor, most entries in the L2 cache will be cast out or removed in favor of the new virtual partition's L2 cache footprint. A cache footprint is the area within the cache, which contains relevant entries to the running workload for the currently executing partition.

The L3 cache often functions as a victim cache. A victim cache is a cache that holds data or instructions that have been evicted or removed from a higher level cache. The L3 cache uses a least recently used (LRU) algorithm to cast out addresses from the L3 cache as new addresses are fetched from memory. As L2 entries from the previous entries, which were cast out, will become stale or age quickly and therefore will be cast out of the L3 cache. This situation occurs because the new virtual partition does not use the entries in the L2 cache that were present because of the prior partition.

As a result, when a switch back to the prior virtual partition occurs, the L3 cache contains very little information in terms of instructions or data for that prior partition because of the aging process. The higher level caches, the L1 and L2 caches, contain information for the current partition. As a result, when a switch is made back to the prior partition, very little information is present for that partition in the higher level cache. As a result, much of the information for this partition has to be retrieved again from main memory or some other location. This situation results in a degradation in performance when a switch occurs between virtual partitions.

SUMMARY OF THE INVENTION

The aspects of the present invention provide a computer implemented method, apparatus, and computer usable code for managing cache data. A partition identifier is associated with a cache entry in a cache, wherein the partition identifier identifies a last partition accessing the cache entry. The partition identifier associated with the cache entry is compared with a previous partition identifier located in a processor register in response to the cache entry being moved into a lower level cache relative to the cache. The cache entry is marked if the partition identifier associated with the cache entry matches the previous partition identifier located in the processor register to form a marked cache entry. The marked cache entry is aged at a slower rate relative to an unmarked cache entry.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flowchart of a process for processing cache entries that are removed from an L2 cache in accordance with an illustrative embodiment of the present invention; and FIG. 7 is a flowchart of a process for aging and removing entries from an L3 cache in accordance with an illustrative embodiment of the present invention.

DETAILED DESCRIPTION OF THE PREFERRED EMBODIMENT

Figure 1:
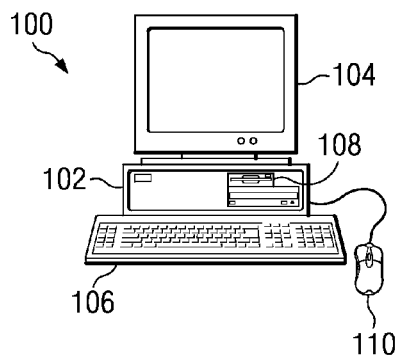
FIG. 1 is a pictorial representation of a data processing system in which the aspects of the present invention may be implemented.

With reference now to the figures and in particular with reference to FIG. 1, a pictorial representation of a data processing system in which the aspects of the present invention may be implemented. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like.

Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
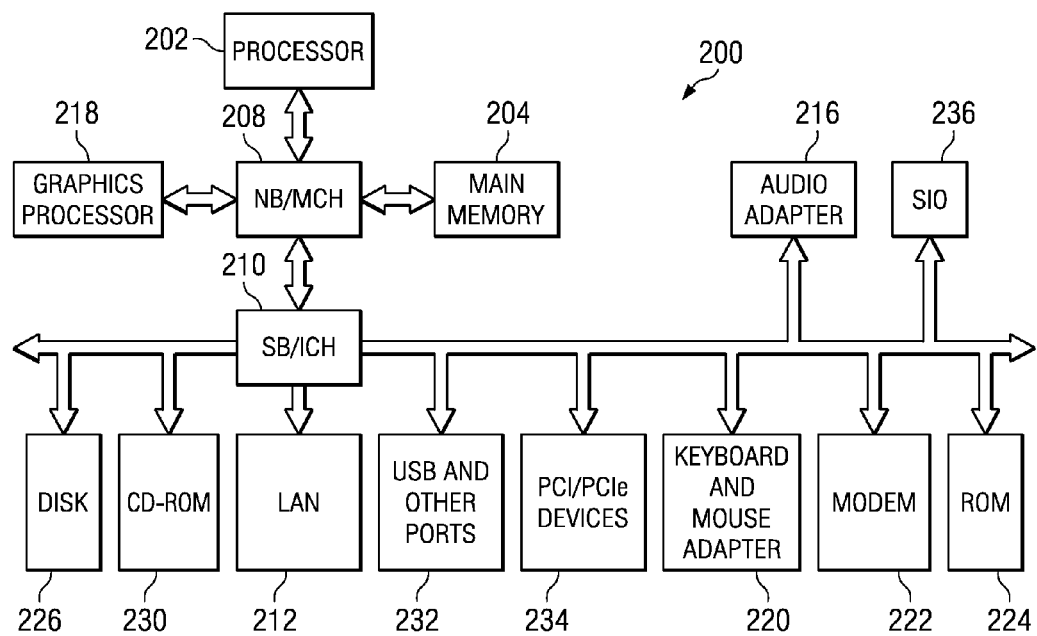
FIG. 2 is a block diagram of a data processing system shown in which aspects of the present invention may be implemented.

With reference now to FIG. 2, a block diagram of a data processing system is shown in which aspects of the present invention may be implemented. Data processing system 200 is an example of a computer, such as computer 100 in FIG. 1, in which code or instructions implementing the processes of the present invention may be located. In the depicted example, data processing system 200 employs a hub architecture including a north bridge and memory controller hub (MCH) 208 and a south bridge and input/output (I/O) controller hub (ICH) 210. Processor 202, main memory 204, and graphics processor 218 are connected to MCH 208. Graphics processor 218 may be connected to the MCH through an accelerated graphics port (AGP), for example.

In the depicted example, local area network (LAN) adapter 212, audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to ICH 210. PCI/PCIe devices may include, for example, Ethernet adapters, add-in cards, PC cards for notebook computers, etc. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be connected to ICH 210.

An operating system runs on processor 202 and coordinates and provides control of various components within data processing system 200 in FIG. 2. The operating system may be a commercially available operating system such as Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). An object oriented programming system, such as WebShpere®, may run in conjunction with the operating system and provides calls to the operating system from programs or applications executing on data processing system 200. WebShpere® is a trademark of International Business Corporation (Java is a trademark of Sun Microsystems, Inc. in the United States, other countries, or both).

Instructions for the operating system, the object-oriented programming system, and applications or programs are located on storage devices, such as hard disk drive 226, and may be loaded into main memory 204 for execution by processor 202. The processes of the present invention are performed by processor 202 using computer implemented instructions, which may be located in a memory such as, for example, main memory 204, read only memory 224, or in one or more peripheral devices.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 204 or a cache such as found in MCH 208. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The different aspects of the present invention provide a computer implemented method, apparatus, and computer usable program code for managing data in a multi-level cache system. In these examples, the multi-level cache system includes L1, L2, and L3 caches. Entries moved or cast out of an L2 cache into an L3 cache due to a virtual partition swap are aged or removed at a slower rate than other entries in the L3 cache. By aging the L2 cache entries, which are cached out during a virtual partition swap at a slower rate, the likelihood that a hot footprint of the L2 cache entries will be present in the L3 cache is increased when the virtual partition is swapped back in for processing in the processor.

The illustrative embodiments use two registers in a processor. The first register contains an identification of the currently running partition. This identification is referred to as the running partition identification. The second register contains the identification of the previous partition that was running in the processor. This identification is referred to as the previous partition identification.

Each entry in the L2 cache is tagged with a partition identification that identifies the partition that last accessed the entry. When an entry from the L2 cache is cast out or removed, the cache entry is marked for slow aging if the last partition that accessed this entry matches the previous partition ID in the registers. The actual aging of cache entries in L3 cache is performed by adding a set of bits to the cache entry. These bits are set when a cache entry is marked for slow aging in the illustrative embodiments. The one or more bits are also referred to as a set of bits in these examples. Each time a cache entry is selected for removal from the L3 cache, the set of bits are inspected. If the set of bits are zero, the entry is cast out or removed from the L3 cache. Otherwise, the set of bits is decremented and the entry is moved back to the head of the list. In these examples, moving an entry back to the head of the list identifies this cache entry as being a most recently used cache entry.

Figure 3:
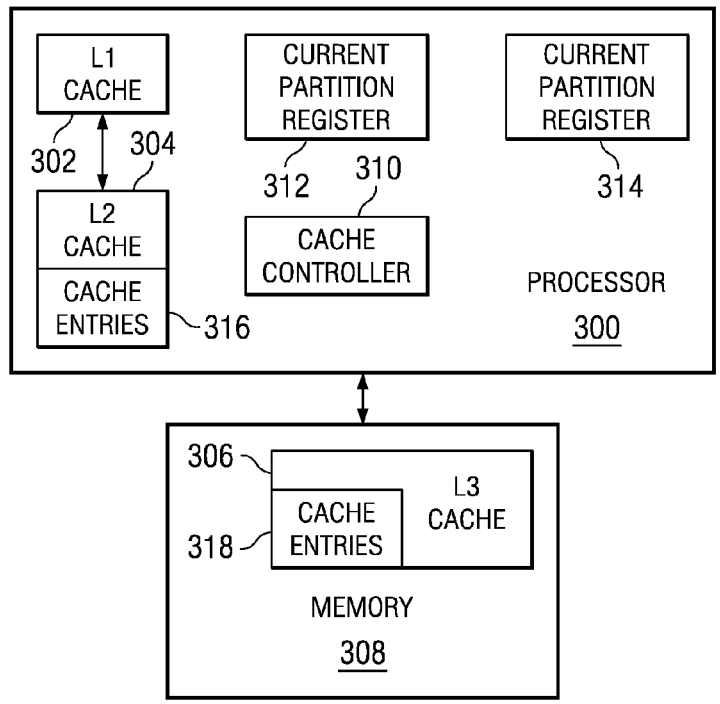
FIG. 3 is a diagram illustrating components used in managing cache entries in a multi-level cache system in accordance with an illustrative embodiment of the present invention.

Turning now to FIG. 3, a diagram illustrating components used in managing cache entries in a multi-level cache system is depicted in accordance with an illustrative embodiment of the present invention. In these examples, processor 300 contains L1 cache 302 and L2 cache 304. An additional cache, L3 cache 306 is located in memory 308. Memory 308 may be, for example, memory on a motherboard. L3 cache 306 has a slower rate of access than L1 cache 302 or L2 cache 304. L3 cache 306, however, has a faster access than system memory. The management of information in these caches is performed using cache controller 310.

Information in the caches in these examples includes instructions, data to be operated on by instructions, or a combination of the two.

Current partition register 312 in processor 300 is an added register containing a current partition identification of the partition that is currently being run by processor 300. Previous partition register 314 also is an additional register used in these examples and contains a previous partition identification. This register identifies the previous partition that was run by processor 300. Cache entries 316 contain information that may be used by processor 300 during execution of a partition. In these examples, each cache entry is a cache line. A cache line is an amount of data transferred between main memory and a cache through a cache line fill or write back operation performed by cache controller 310. Each cache entry within cache entries 316 is associated with a partition identifier. This partition identifier identifies that last partition that accessed the cache entry.

When a currently running partition is swapped out to run a new partition, processor 300 sets current partition register 312 with the identification of the new partition. The partition identifier of the partition being swapped out is placed into previous partition register 314. These operations are performed by cache controller 310 in these examples.

When a new partition is swapped in for executing by processor 300, most of the entries and cache entries 316 are removed or cast out of L2 cache 304 and placed in L3 cache 306 as new addresses are fetched from memory for the new partition. Thus, L3 cache 306 acts as a victim cache in this example. Each time an entry is selected for removal from L2 cache 304, cache controller 310 compares the partition identifier associated with the cache entry to the previous partition identifier located within previous partition register 314. If a match between these two identifiers is present, a set of bits is set for that cache entry when it is placed into cache entries 318 and L3 cache 306.

Setting the set of bits allows for slower aging of entries that are associated with the previous partition identifier in previous partition register 314. By slowing the aging of cache entries associated with the previous partition, these cache entries are maintained for a longer period of time and are more likely to be available when the previous partition is swapped back in for executing by processor 300.

In these illustrative examples, cache controller 310 removes entries from cache entries 318 when L3 cache 306 becomes too full. L3 cache is considered too full when the some threshold is reached or exceeded in these examples. This threshold may be when L3 cache is entirely full or some other amount of usage within L3 cache 306. Alternatively, the removal of cache entries may be performed in response to any event depending on the particular implementation. This event may be periodic or non-periodic. A cache entry is removed because the location is needed. If 8 sets are present within congruence classes, then only eight entries may be present per congruence class. Therefore to insert a ninth entry, one current entry must be cast out. The aspects of the present invention age entries at a different rate so that some entries stay in the cache longer.

In these examples, cache entries are selected for removal using a least recently used algorithm (LRU). Each time a cache entry within cache entries 318 is selected for removal, cache controller 310 inspects the set of bits and determines whether the set of bits is equal to zero. If the set of bits is equal to zero, the cache entry is cast out or removed from L3 cache 306. Otherwise, the set of bits is decremented, and the entry is moved back to the head of the list and is considered a most recently used cache entry at that point. L2 entries for the previous partition become stale quickly as the current partition executes.

Figure 4:
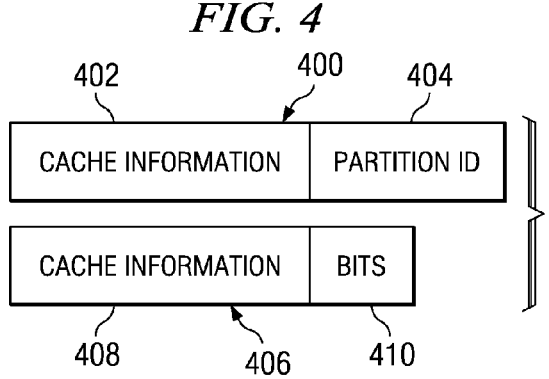
FIG. 4 is a diagram illustrating example cache entry in accordance with an illustrative embodiment of the present invention.

Turning next to FIG. 4, a diagram illustrating example cache entry is depicted in accordance with an illustrative embodiment of the present invention. Cache entry 400 is an example of a cache entry located in an L2 cache, such as L2 cache 304 in FIG. 3. Cache entry 400 contains cache information 402 and partition identifier 404. Cache information 402 contains either data or instructions for use by the processor. Partition identifier 404 is an identification of the partition that last accessed cache entry 400.

Cache entry 406 is an example of a cache entry stored in an L3 cache, such as L3 cache 306 in FIG. 3. Cache entry 406 contains cache information 408 and bits 410. Bits 410 is a set of bits that is used to age cache entries in an L3 cache. Bits 410 are set when the cache entry removed from the L2 cache was last accessed by the previous partition that was swapped out. Bits 410 is a set of bits that may comprise one or more bits, depending on the particular implementation. Bits 410 is decremented each time cache entry 406 is selected for removal from the L3 cache. If bits 410 is not equal to zero, bits 410 are decremented.

Otherwise, cache entry 406 is removed from the L3 cache. If cache 406 is not removed from the L3 cache, this cache entry moved to the head of the list and is now considered a most recently used cache entry in this particular example. Of course, depending on the particular implementation, cache entry 406 may not be moved to the head of the list.

Figure 5:
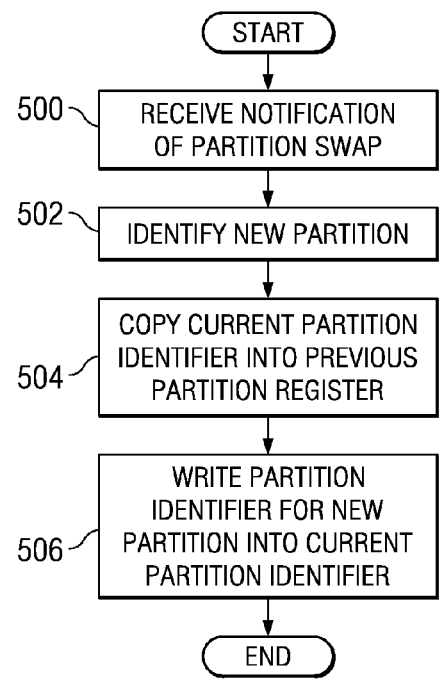
FIG. 5 is a flowchart of a process for setting processor registers in accordance with an illustrative embodiment of the present invention.

Turning now to FIG. 5, a flowchart of a process for setting processor registers is depicted in accordance with an illustrative embodiment of the present invention. The process illustrated in FIG. 5 may be implemented within a device, such as cache controller 310 in FIG. 3. In particular, this process handles the setting of a current partition register and a previous partition register such as those illustrated in FIG. 3.

The process begins by receiving a notification of a partition swap (step 500). Thereafter, the process identifies the new partition that is to be run by the processor (step 502). A copy of the current partition identifier is copied into the previous partition register (step 504). Then, the process writes the partition identifier for the new partition into the current partition identifier (step 506) with the process terminating thereafter.

Turning now to FIG. 6, a flowchart of a process for processing cache entries that are removed from an L2 cache is depicted in accordance with an illustrative embodiment of the present invention. The process illustrated in FIG. 6 may be implemented in a cache controller, such as cache controller 310 in FIG. 3. This process is initiated when a partition swap occurs in these examples.

The process begins by detecting the removal of a cache entry from the L2 cache for placement in the L3 cache (step 600). The last partition accessing the cache entry is identified (step 602). The last partition is identified in step 602 by examining a partition identifier associated with the cache entry. The previous partition in the processor is identified using the previous partition identifier from the processor register (step 604). In this example, the processor register is a previous partition register.

Next, a determination is made as to whether a match between the last partition and the previous partition is present (step 606). This determination is made by comparing the partition identifier associated with the cache entry with the previous partition identifier with the process identifier. If a match is present, bits are set for the cache entry (step 608), with the process terminating thereafter. The process also terminates in step 606 if a match is not present.

Turning to FIG. 7, a flowchart of a process for aging and removing entries from an L3 cache is depicted in accordance with an illustrative embodiment of the present invention. The process illustrated in FIG. 7 may be implemented in a cache controller, such as cache controller 310 in FIG. 3.

The process begins by selecting a cache entry for removal from the L3 cache (step 700). Next, a determination is made as to whether the set of bits in the selected cache entry is equal to zero (step 702). If the set of bits in the selected cache entry does not equal zero, the set of bits is decremented (step 704). The cache entry is moved to the head of the list (step 706). Moving the cache entry to the head of the list makes this entry a most recently used cache entry. Next, a determination is made as to whether more cache entries are selected (step 708). If no more cache entries to be selected are present, the process terminates thereafter. If more cache entries to be selected are present, the process returns to step 700 to select cache entry for removal from the L3 cache.

Turning back to step 702, if the set of bits in the selected cache entry equals zero, the cache entry is removed from the L3 cache (step 710), with the process proceeding to step 708.

The invention can take the form of an entirely hardware embodiment, an entirely software embodiment or an embodiment containing both hardware and software elements. In a preferred embodiment, the present invention is implemented in hardware, such as a cache controller. In other embodiments, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising:
   a computer readable storage medium including computer usable program code for managing cache data, said computer program product including;
   computer usable program code for associating a partition identifier with a cache entry in a cache, wherein the partition identifier identifies a last partition accessing the cache entry;
   computer usable program code, responsive to the cache entry being moved into a lower level cache relative to the cache, for comparing the partition identifier associated with the cache entry with a previous partition identifier located in a processor register; and
   computer usable program code for marking the cache entry if the partition identifier associated with the cache entry matches the previous partition identifier located in the processor register to form a marked cache entry, wherein the marked cache entry is aged at a slower rate relative to an unmarked cache entry.

2. The computer program product of claim 1 wherein the computer usable program code further comprises:
   computer usable program code for moving the cache entry into the lower level cache when a partition swap occurs.

3. The computer program product of claim 1 wherein the computer usable program code further comprises:
   computer usable program code for setting a set of bits for the marked cache entry.

4. The computer program product of claim 3 wherein the computer usable program code further comprises:
   computer usable program code for selecting a particular cache entry for removal from the lower level cache;
   computer usable program code for determining whether a set of bits for the particular cache entry is equal to zero;

computer usable program code for removing the particular cache entry from the lower level cache if the set of bits for the particular cache entry is equal to zero; and computer usable program code for decrementing the set of bits for the particular cache entry if the set of bits is not equal to zero.

5. The computer program product of claim 4 wherein the computer usable program code further comprises:

computer usable program code for moving the particular cache entry to a head of a list of cache entries if the set of bits is not equal to zero.

6. The computer program product of claim 1, wherein the cache is a L2 cache and the lower level cache is a L3 cache.

7. The computer program product of claim 1, wherein the processor register is a second processor register and a first processor register contains an identification of a current partition.

8. The computer program product of claim 1, wherein the computer usable program code for selecting a particular cache entry for removal from the lower level cache is performed using a least recently used algorithm.

9. A data processing system comprising:

a bus;

a communications unit connected to the bus;

a storage device connected to the bus, wherein the storage device includes a computer usable code;

a processor unit connected to the bus, wherein the processor unit executes the computer usable code to associate a partition identifier with a cache entry in a cache, wherein the partition identifier identifies a last partition accessing the cache entry; and compare the partition identifier associated with the cache entry with a previous partition identifier located in a processor register in response to the cache entry being moved into a lower level cache relative to the cache; and mark the cache entry if the partition identifier associated with the cache entry matches the previous partition identifier located in the processor register to form a marked cache entry, wherein the marked cache entry is aged at a slower rate relative to an unmarked cache entry.

10. The data processing system of claim 9 wherein the processor unit further executes the computer usable code to move the cache entry into the lower level cache when a partition swap occurs.

11. The data processing system of claim 9 wherein the processor unit further executes the computer usable code to set a set of bits for the marked cache entry to mark the marked cache entry.

12. The data processing system of claim 11 wherein the processor unit further executes the computer usable code to select a particular cache entry for removal from the lower level cache; determine whether a set of bits for the particular cache entry is equal to zero; remove the particular cache entry from the lower level cache if the set of bits for the particular cache entry is equal to zero; and decrement the set of bits for the particular cache entry if the set of bits is not equal to zero.

* * * * *